US005576375A

United States Patent [19]

Olsen et al.

[11] Patent Number: 5,576,375
[45] Date of Patent: *Nov. 19, 1996

[54] POLY (PHENYLENE-VINYLENE) RESINS FROM VINYLETHYNYLBENZENE AND DIETHYNYLBENZENE

[75] Inventors: Robert E. Olsen, Placerville; Harlan F. Reese, Sacramento; Stephen J. Backlund, Fair Oaks, all of Calif.

[73] Assignee: Aerojet- General Corporation, Sacramento, Calif.

[*] Notice: The portion of the term of this patent subsequent to Jun. 15, 2008, has been disclaimed.

[21] Appl. No.: 207,321

[22] Filed: Jun. 15, 1988

[51] Int. Cl.$^6$ ............................. C08F 38/04; C08K 5/01; C08L 49/00
[52] U.S. Cl. .......................... 524/481; 524/483; 526/285; 427/228
[58] Field of Search ........................ 526/285; 524/481, 524/483

[56] References Cited

U.S. PATENT DOCUMENTS

| | | | |
|---|---|---|---|
| 3,300,456 | 1/1967 | Hay | 526/135 |
| 3,332,916 | 7/1967 | Hay | 526/241 |
| 3,519,611 | 7/1970 | Hay | 528/392 |
| 3,705,131 | 12/1972 | Korshak et al. | 260/47 |
| 3,816,374 | 6/1974 | White | 526/285 X |
| 3,821,153 | 6/1974 | White | 524/481 |
| 4,026,859 | 5/1977 | Cessna, Jr. | 524/111 |
| 4,108,942 | 8/1978 | Chalk et al. | 260/875 |
| 4,273,906 | 10/1978 | Economy et al. | 526/285 |

FOREIGN PATENT DOCUMENTS

| | | | |
|---|---|---|---|
| 2133236 | 12/1972 | France. | |
| 2043494 | 5/1971 | Germany. | |
| 2235429 | 1/1973 | Germany. | |
| 62-292810 | 12/1987 | Japan | 526/285 |

OTHER PUBLICATIONS

A. J. Chalk et al., "A New Simple Synthesis of Soluble High Molecular Weight Polyphenylenes by the Cotrimerization of Mono– and Bifunctional Terminal Acetylenes," J. Polymer Sc., vol. 10, 2033–2043 (1972).
W. Bracke, "Synthesis of Soluble, Branched Polyphenyls," J. Polymer Sci., Vo. 10, 2097–2101 (1972).
D. A. Frey et al., "Preparation and Aromatization of Poly–1, 3–Cyclohexadiene," J. Polymer Sci., vol. 1, 2057–2065 (1963).
P. Kovacic, "Polymerization of Benzene to p–Polyphenyl by Ferric Chloride," J. Organic Chem., vol. 28, 1864–67 (1963).
G. A. Edwards, "Polyphenyl," J. Polymer Sci., vol. XVI, 589–597 (1955).
N. Bilow, "Ablative Phenolic and Polyphenylene Resins," Hughes Aircraft Company Technical Report AFML–TR–65–8 (1965).
V. V. Korshak, "The Principal Characteristics of Polycyclotrimerization," Vysokomol. soyed, A16:No. 5, 926–943 (1974).
A. E. Newkirk, "Thermal Degradation of Poly(m–diethynylene Benzene)," J. Polymer Sci., vol. 2, 2217–2233 (1964).
A. Furlani, "Aromatization Reactions of Acetylenic Hydrocarbons . . . ," Polymer Letters, vol. 5, 523–526 (1967).
C. I. Simionescu et al., "Polymerization of Acetylenic Derivatives.XXX. Isomers of Polyphenylacetylene," J. Polymer Sci., vol. 15, 2497–2509 (1977).
V. V. Korshak et al., "Synthesis of Branched Oligophenylenes with Double Bonds," Vysokomol. Soedin, Ser.B., 16(3), 201–4 (1974).
V. A. Sergeev, "Polycyclotrimerization of Acetylenic Compounds," Dokl. Vses. Konf. Khim. Atsetilena, 4th., 3 (1972).

Primary Examiner—Richard D. Lovering
Attorney, Agent, or Firm—Townsend and Townsend and Crew LLP

[57] ABSTRACT

A novel resin is formed by the copolymerization of vinylethynylbenzene and diethynylbenzene. Polymerization is carried out under conditions which result in the retention of both unreacted vinyl groups from the vinylethynylbenzene component and unreacted ethynyl groups from the diethynyl component, both of which are then susceptible to crosslinking. The polymer is useful in the formation of high-performance carbon-carbon composites, producing an unusually high char yield with advantageous handling and processing characteristics.

20 Claims, No Drawings

POLY (PHENYLENE-VINYLENE) RESINS FROM VINYLETHYNYLBENZENE AND DIETHYNYLBENZENE

This invention relates to poly(phenylenevinylene) resins for use in forming high-density carbon materials.

BACKGROUND OF THE INVENTION

High-density carbon-carbon composites are extremely strong materials capable of withstanding high temperatures. Such composites find use in the manufacture of structural parts for high-performance use, high-performance coatings, semi-conductor encapsulators and high-performance insulators. Examples of structural parts made from these materials are as heat shields for reentry vehicles and solid propellant rocket motor nozzles.

These composites are formed from resins, phenolic resins being in general use at present, by pyrolysis. Certain qualities of the resins are significant in terms of their processing and performance as well as the characteristics of the final product. These resin qualities include solubility, flow characteristics, and char yield upon pyrolysis of the resin, as well as mechanical properties of the final product. A high char yield, or low volatiles content, is particularly important, since it relates to the minimization of weight loss shrinkage, pores and cracking upon graphitization. The char yield may be expressed as the weight remaining after thermal treatment to 1000° C.

The phenolic resins in current use generally have char yields of less than 50%, due to the release of such decomposition products as water, carbon monoxide, phenol and methane upon pyrolysis and carbonization. With such a high quantity of volatiles produced, the resulting composite is porous, low in density and susceptible to stress due to matrix shrinkage. To compensate for these deficiencies, the composite after first having been formed is impregnated with coal tar pitch and repyrolysed (i.e., "densified"). Five to seven densification cycles are generally required to achieve a product with thermostructural properties adequate for high performance use.

SUMMARY OF THE INVENTION

Novel resins based on aromatic acetylene hydrocarbon structures are provided herein. These resins are generally prepared by copolymerization of a vinylethynylbenzene and a diethynylbenzene, whose structural formulas are as follows:

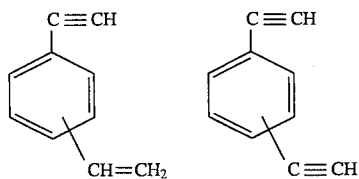

The monomers are polymerized in such a manner as to leave substantial portions of the vinyl and the ethynyl groups of the monomers unreacted.

The resin offers a number of advantageous properties which distinguish it from both phenolic resins commonly used in carbon-carbon composite materials and other polyphenylene resins. Included among these properties are the fact that the resin is formed by relatively low-temperature polymerization, and once formed is soluble in common solvents. In addition, the resin crosslinks at a relatively low temperature, and produces a product with unexpectedly high thermal stability and char yield upon pyrolysis. As an indication of the char yield, a typical material within the scope of this invention show a weight loss of only 10% at 560°–570° C. By contrast, poly(phenylene-ethylene) materials of the type

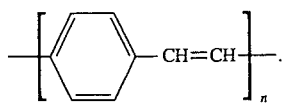

which are outside the scope of the invention, show a 50% weight loss at 420°–430° C.

Carbonization and graphitization of the resins within the present invention thus result in products which need little densification and have unusually high structural integrity. The highly aromatic nature of the resins further imparts thermal and chemical stability during processing. The absence of heteroatoms further contributes to the ease of processing, by reducing the presence of impurities which interfere with densification.

The high char yield causes very low shrinkage of the final product. This permits use of the resins in forming parts and components which cannot be formed using conventional phenolic materials due to the shrinkage which such materials exhibit upon carbonization. Air frame components are one example. The high char yield also imparts very high strength to the product.

DETAILED DESCRIPTION OF THE INVENTION AND PREFERRED EMBODIMENTS

In accordance with the present invention, the resin is formed by the copolymerization of the monomers to produce a structure consisting off phenyl rings containing side chains, linked together by vinylene groups. The linked ring structure will include internal vinyl groups (—CH═C), terminal vinyl groups (—CH═CH$_2$), and terminal ethynyl groups (—C≡CH).

A typical structure is as follows:

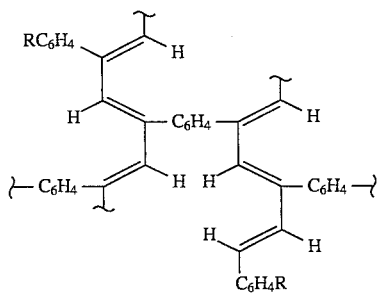

where R is either vinyl (—CH═CH$_2$) or ethynyl (—C≡CH).

The vinylethynylbenzene and diethynylbenzene are conveniently prepared as a mixture. As stated above, the ratio of these two components will vary depending on the characteristics sought for the resin which results upon polymerization. In most cases, a mixture in which the diethynyl component comprises from about 30% to about 85% by weight will provide the best results, with about 50% to about 75% by weight preferred. The positions of the ring substituents may be either ortho-, meta- or para- with respect to each other. The meta- and para-isomers are preferred. Particularly preferred is a mixture of meta- and para-isomers, since such a mixture promotes increased solubility of the resulting resin in organic solvents, and increased flexibility of the resulting polymers in all stages up to carbonization.

Technical grade divinylbenzene is particularly useful for the preparation of the vinylethynylbenzene/diethynylbenzene mixture. Technical grade divinylbenzene is a mixture of divinyl and vinylethylbenzenes with minor amounts of diethylbenzenes and naphthalene. The divinylbenzenes are present in greater amounts than the vinylethylbenzenes, and the meta-isomers predominate.

The monomer mixture may be conveniently prepared from a mixture of divinylbenzene and ethylvinylbenzene by bromination followed by dehydrobromination, according to conventional procedures. Addition of bromine to the carbon-carbon double bonds occurs rapidly at room temperature in carbon tetrachloride solution. Bromination at the ethyl group may be accomplished by the use of a free-radical initiator or by refluxing in carbon tetrachloride, the free-radical reaction occurring more rapidly. Dehydrobromination is then achieved by the use of a non-nucleophilic base, such as potassium t-butoxide or a phase transfer catalyst with powdered potassium hydroxide. The resulting monomer may then be extracted with hexane, then purified by distillation or chromatography.

Conditions for the polymerization reaction will be selected to retain as many vinyl groups from the vinylethynylbenzene and as many ethynyl groups from the diethynylbenzene (to a maximum of one per diethynylbenzene molecule) as possible. In preferred embodiments, the polymer will contain at least about 50% of the vinyl groups, preferably at least about 75%. As for the retained ethynyl groups, preferred embodiments of the invention will contain at least about 1 milligram of terminal ethynyl groups per gram of polymer, preferably at least about 2 milligrams, and most preferably at least about 4 milligrams.

Polymerization may be effected by simply heating the monomer mixture to an elevated temperature. The reaction rate will vary with temperature, and preferred temperatures are those less than about 200° C. Temperatures ranging from about 90° C. to about 150° C. are more preferred, with about 100° C. to about 120° C. the most preferred. The reaction may be conducted in air or under an inert atmosphere, at atmospheric pressure.

At the completion of the reaction, the polymer may be isolated and purified in accordance with conventional techniques. For example, the product in organic solvent may be precipitated by addition to methanol to yield a cream-colored or yellow powder. Further purification and fractionation may be achieved by the portionwise addition of methanol to a toluene solution of the polymer.

In its preferred form, the polymer will have a molecular weight ranging from about 1,000 to about 100,000, preferably from about 2,000 to about 50,000, with a softening point ranging from about 200° C. to about 300° C.

Once formed, the polymer is preferably dissolved in a solvent to facilitate processing. Conventional organic solvents may be used. A particularly preferred solvent, however, is the monomer mixture referred to above, which can be conveniently formed from technical grade divinylbenzene. This solvent is preferred for purposes of further polymerization, since it introduces no heteroatoms. Preferred solutions are those in which the polymer comprises from about 25% to about 75% by weight, with about 40% to about 60% by weight particularly preferred.

The polymer may be processed into high-performance structural materials in accordance with conventional techniques used in forming carbon-carbon composites. In accordance with such techniques, a carbon filler, such as finely divided graphite, for example, is generally used to increase the resin density, toughness and char yield. Surface-active agents, particularly non-ionic surfactants may be used to enhance the wetting of the graphite and to help avoid agglomeration. Typical procedures for cure and pyrolysis would be curing at a temperature of about 100°–200° C., carbonization at a temperature of about 800°–1,000° C., then forming the carbonized resin into the desired structure, followed by graphitization at 1800°–2500° C.

The following examples are offered for purposes of illustration, and are not intended to limit the invention in any manner.

EXAMPLE 1

A. Preparation of Monomer Mixture

To a 1-liter, round bottomed flask fitted with an addition funnel, thermometer, stirrer, an ice-water cooling bath and a $N_2$ purge connected to a caustic trap, was charged 500 mL of carbon tetrachloride and 100 g of technical-grade divinylbenzene (analysis shown in Table 1). The solution was cooled to 10° C., and bromine (256 g, 1.6 mol) was added dropwise, maintaining the reaction temperature at less than 20° C. by controlling the rate of addition. Benzoyl peroxide (5.0 g, 20.6 mmol) was added, and the mixture slowly heated to reflux (79° C.). (Caution: HBr evolved). The process was monitored by capillary column gas chromatography, and when conversion to α-bromoethyl-1,2-dibromoethylbenzene reached 99%, heating was discontinued. After cooling to ambient, the reaction mixture was washed with 100 mL of 25% caustic solution and then twice with 250 mL aliquots of water. The solution was dried ($MgSO_4$) and stripped to yield 317 g (102%) of yellow solid.

To a 3-liter, round bottomed flask fitted with high speed agitation, a reflux condensor, thermometer and static $N_2$ head was charged 600 mL of petroleum ether, 135 g of brominated divinylbenzene, 6.6 g ( 0.012 mol) of tetraoctyl ammonium bromide and 316 g (5.6 mol) of powdered potassium hydroxide. The rapidly stirred mixture was heated to reflux (75°–80° C.) until the reaction was complete (~3 hours) as shown by capillary column gas chromatography. The mixture was filtered, the filter cake washed with 100 mL of petroleum ether, and the combined filtrates stripped to yield 31.2 g (88% yield) of pale yellow liquid.

TABLE 1

Capillary Column Gas Chromatograph
Area Percent Analysis of Technical-Grade
Divinylbenzene and Monomer Mixture

| Starting Material | Area % | Monomer Mixture | Area % |
|---|---|---|---|
| m-divinyl | 41.2 | m-diethynyl | 46 |
| p-divinyl | 15.4 | p-diethynyl | 15 |
| m-vinylethyl | 30.9 | m-vinylethynyl | 29 |
| p-vinylethyl | 8.5 | p-vinylethynyl | 9 |
| m-diethyl | 0.9 | m, p-divinyl | <1 |
| p-diethyl | 0.9 | | |
| naphthalene | 1.6 | naphthalene | <1 |

B. Preparation of Poly(diethynylbenzenevinyl-ethynylbenzene)

To a 500-mL, round bottomed flask fitted with a reflux condenser, thermometer and stirrer was added 200 mL of xylene and 50 g of the monomer mixture of part A above. The solution was heated to 120° C. and monitored by capillary column gas chromatography for the disappearance of monomer. After 42 hours heating, the reaction solution was cooled to ambient temperature. Addition of the xylene solution to 2 liters of methanol precipitated the polymer as a fine yellow-brown solid. The product was dried to constant weight under vacuum at 50° C. to give 18.6 g. After stripping of solvent, 19.2 g of monomer was recovered.

Product analysis yielded the following results:

Ethynyl content: FT-IR measurement of acetylenic C—H absorption band indicated 5.16 mg terminal ethynyl groups per gram polymer (phenylacetylene used as standard)

Molecular weight: ~4,000, range 42,000–1000

Softening point: >250° C.

Solubility: 0.4 g/g toluene at 30° C.

DTA (Differential Thermal Analysis): exotherm onset 160° C., maximum 210° C.

Thermal stability tests yielded the following results:

TABLE 2

Thermal Stability

| Post Cure Time At 300° C. | Temperature of 10% Wt. loss, °C. | Weight Retention At 600° C. | 1000° C. |
|---|---|---|---|
| 0 | 570 | 87.5 | — |
| 24 | 560 | 86.9 | — |
| 48 | 570 | 87.5 | 83.4 |

EXAMPLE 2

Part B of Example 1 was repeated, varying the temperature and using both nitrogen and air atmospheres. The results are shown in Table 3, indicating a slow reaction rate at 100° C. and a moderate rate at 120° C., with no variability attributable to the difference in atmosphere or to the presence of a free-radical initiator (benzoyl peroxide).

TABLE 3

Temperature vs. Reaction Rate

Percent Monomer Remaining

| Reaction Time (hours) | 100° C. Under $N_2$ | 100° C. Under Air | 100° C. Under $N_2$* | 120° C. Under $N_2$ |
|---|---|---|---|---|
| 1 | 99.8 | 99.5 | 94.1 | 92.3 |
| 2 | 94.6 | 97.7 | 91.3 | 88.4 |
| 3 | 92.8 | 95.9 | 93.4 | 85.7 |
| 4 | 95.3 | 94.1 | 88.2 | 83.3 |
| 6 | 94.7 | 93.2 | 89.4 | 76.7 |
| 24 | 88.8 | 87.8 | 85.6 | 49.4 |
| 30 | 85.6 | 79.3 | 72.3 | 42.8 |
| 48 | 83.1 | 81.3 | 82.3 | 25.2 |
| 54 | 76.1 | 70.0 | 66.2 | 22.4 |
| 120 | 69.1 | 65.6 | 68.5 | 3.2 |

*Benzoyl peroxide present as free-radical initiator.

EXAMPLE 3

The polymer produced in Part B of Example 1 was crosslinked by heating to 300° C. under a nitrogen atmosphere for 48 hours. Infrared absorbance spectra at 0, 24 and 48 hours showed disappearance of the 3294 $cm^{-1}$ band representing the ethynyl carbon-hydrogen bond, as an indication that crosslinking had occurred at the ethynyl groups. Thermal gravimetric analysis (TGA) showed 87.5% weight retention at 600° C.,

EXAMPLE 4

Resins were prepared by dissolving the product of Example 1 in the monomer mixture to give a clear, viscous solution. Samples of the solution weighing 6 to 10 grams were then cast into films, placed in an autoclave and cured at various temperatures and pressures, with heating up to temperature and cooling being spread out over 8 hours to minimize exotherms and fracture due to thermal shock. Thermal gravimetric analyses were then performed with the results shown in Table 4.

TABLE 6

Resin Properties

| Resin Composition (wt %) | | | Cure Conditions* | Density (g/cc) | TGA Analysis at 10° C./min | | |
|---|---|---|---|---|---|---|---|
| | | | | | Temp. for 10% wt. loss | % Wt. Retention | |
| Monomer | Polymer | Graphite | | | | 600° C. | 1000° C. |
| — | 100 | — | uncured | — | 570 | 87.5 | — |
| — | 100 | — | (1) | — | 560 | 86.9 | — |

TABLE 6-continued

| Resin Composition (wt %) | | | Cure Conditions* | Density (g/cc) | TGA Analysis at 10° C./min | | |
| --- | --- | --- | --- | --- | --- | --- | --- |
| | | | | | Temp. for | % Wt. Retention | |
| Monomer | Polymer | Graphite | | | 10% wt. loss | 600° C. | 1000° C. |
| — | 100 | — | (2) | — | 570 | 87.5 | — |
| 50 | 50 | — | (3) | 1.16 | 562 | 88.0 | — |
| 50 | 50 | — | (4) | 1.12 | 580 | 89.0 | — |
| 50 | 50 | — | (5) | 1.12 | 585 | 89.1 | 83.1 |
| 40 | 40 | 20 | (6) | — | — | 92.0 | 85.4 |

*Cure Conditions:
(1) 300° C., 24 h under $N_2$
(2) 300° C., 48 h under $N_2$
(3) 90° C., 16 h at 200 psig $N_2$; 16 h at 200 psig $N_2$
(4) 90° C., 16 h at 200 psig $N_2$; 200° C., 16 h at 200 psig $N_2$; 300° C., 24 h under $N_2$
(5) 90° C., 16 h at 200 psig $N_2$; 200° C., 16 h at 200 psig $N_2$; 300° C., 48 h under $N_2$
(6) Pyrolysis; 600° C., 4–6 h under Ar The foregoing is offered primarily for purposes of illustration. It will be readily apparent to those skilled in the art that numerous variations, modifications and substitutions may be made in the materials, procedural steps and conditions described herein without departing from the spirit and scope of the invention.

What is claimed is:

1. A poly(phenylene-vinylene) polymer formed by the copolymerization of a monomer mixture consisting essentially of the following monomers

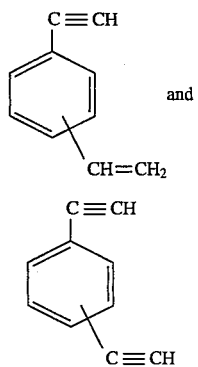

by reaction at the triple bonds thereof by heat only, said polymer containing at least substantial portions of the —C≡CH groups and —CH=CH$_2$ groups from said monomers.

2. A poly(phenylene-vinylene) polymer in accordance with claim 1 containing at least about 4 milligrams —C≡CH groups per gram of said polymer.

3. A poly(phenylene-vinylene) polymer in accordance with claim 1 containing at least about 75% of said —CH=CH$_2$ groups.

4. A poly(phenylene-vinylene) polymer in accordance with claim 1 having an average molecular weight of from about 2,000 to about 50,000.

5. A poly(phenylene-vinylene) polymer in accordance with claim 1 in which monomer (b) comprises from about 50% to about 75% by weight of monomers (a) and (b) combined.

6. A poly(phenylene-vinylene) polymer in accordance with claim 1 in which monomers (a) and (b) are independently either meta-isomers, para-isomers or a combination thereof.

7. A process for forming a poly(phenylene-vinylene) polymer containing pendant unsaturated groups available for crosslinking, said process comprising copolymerizing a monomer mixture consisting essentially of the following monomers

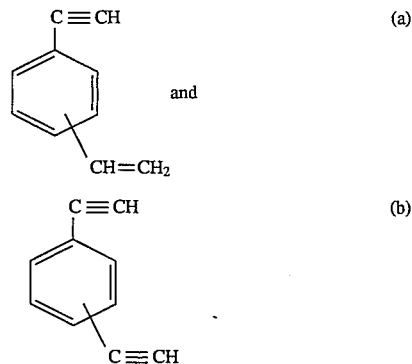

by reaction at the triple bonds thereof by heat only, under conditions selected to leave at least substantial numbers of —C≡CH groups and —CH=CH$_2$ groups unreacted.

8. A process in accordance with claim 7 in which said conditions consist essentially of heating said monomers to a temperature of from about 90° C. to about 150° C.

9. A process in accordance with claim 7 in which said conditions consist essentially of heating said monomers to a temperature of from about 100° C. to about 120° C.

10. A process in accordance with claim 7 in which said conditions are selected to provide said polymer with at least about 4 milligrams of —CH≡CH groups per gram of said polymer.

11. A process in accordance with claim 7 in which said conditions are selected to provide said polymer with at least about 75% of said —CH=CH$_2$ groups.

12. A process in accordance with claim 7 in which said conditions are selected to provide said polymer with an average molecular weight of from about 2,000 to about 50,000.

13. A process in accordance with claim 7 in which monomer (b) comprises from about 50% to about 75% by weight of monomers (a) and (b) combined.

14. A process in accordance with claim 7 in which monomers (a) and (b) are independently either meta-isomers, para-isomers or a combination thereof.

15. A poly(phenylene-vinylene) resin solution comprising a copolymer of a monomer mixture consisting essentially of the following monomers

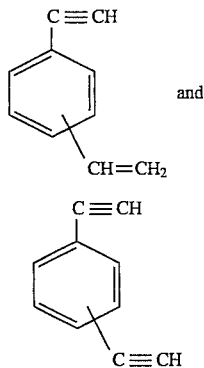

reacted at the triple bonds thereof by heat only, said copolymer containing at least substantial portions of the —C≡CH groups and —CH=CH$_2$ groups from said monomers, and said copolymer dissolved in a mixture of said monomers.

16. A poly(phenylene-vinylene) resin solution in accordance with claim 15 in which said copolymer contains at least about 4 milligrams of —C≡CH groups per gram of said copolymer.

17. A poly(phenylene-vinylene) resin solution in accordance with claim 15 in which said copolymer contains at least about 75% of said —CH=CH$_2$ groups.

18. A poly(phenylene-vinylene) resin solution in accordance with claim 15 in which said copolymer has an average molecular weight of from about 2,000 to about 50,000.

19. A poly(phenylene-vinylene) resin solution in accordance with claim 15 in which monomer (b) comprises from about 50% to about 70% by weight of monomers (a) and (b) combined.

20. A poly(phenylene-vinylene) resin solution in accordance with claim 15 in which monomers (a) and (b) are independently either meta-isomers, para-isomers or a combination thereof.

* * * * *